US005469136A

United States Patent [19]

Matsubara et al.

[11] Patent Number: 5,469,136

[45] Date of Patent: Nov. 21, 1995

[54] TIRE INFLATION PRESSURE MONITORING APPARATUS

[75] Inventors: Kousuke Matsubara; Takeo Fukumura, both of Yokohama, Japan

[73] Assignee: NHK Spring Co., Ltd., Yokahama, Japan

[21] Appl. No.: 298,830

[22] Filed: Aug. 31, 1994

[30] Foreign Application Priority Data

Aug. 31, 1993 [JP] Japan .................................. 5-215728
Aug. 31, 1993 [JP] Japan .................................. 5-215729

[51] Int. Cl.[6] .................................................. B60C 23/04

[52] U.S. Cl. ........................ 340/445; 340/444; 73/146.4; 200/61.25; 364/558

[58] Field of Search .................................. 152/415, 427, 152/429, 431; 73/146.4; 340/445, 444; 364/558; 200/61.25

[56] References Cited

U.S. PATENT DOCUMENTS

| | | | |
|---|---|---|---|
| 3,781,787 | 12/1973 | Sugiyama | 200/61.25 X |
| 4,119,944 | 10/1978 | Smith | 73/146.5 |
| 4,235,185 | 11/1980 | Byram | 73/146.8 X |
| 4,562,874 | 1/1986 | Scheller | 152/427 |
| 4,742,857 | 5/1988 | Gandhi | 152/419 |
| 4,807,468 | 2/1989 | Galan | 73/146.5 |
| 4,953,394 | 9/1990 | Franke et al. | 73/146.5 |

FOREIGN PATENT DOCUMENTS

WO92/16385 10/1992 WIPO .

*Primary Examiner*—Michael W. Ball
*Assistant Examiner*—Francis J. Lorin
*Attorney, Agent, or Firm*—Pennie & Edmonds

[57] ABSTRACT

A tire inflation pressure monitoring apparatus comprises a reference magnet fixed to a wheel, a movable magnet whose position shifts depending on the inflation pressure of a tire, and a magnetic sensor for detecting the magnetism of the magnets. The reference magnet can be moved in the axial direction of the wheel by means of a position adjusting mechanism. Thus, a relative distance from the reference magnet to the movable magnet can be adjusted to a fixed value (e.g., zero) at the time of calibration. An electric circuit section is stored with a computation formula or a map indicative of the relationships between outputs of the magnetic sensor and minimum distances from the magnets to the magnetic sensor. In detecting the inflation pressure of the tire, data associated with the minimum distances from the magnetic sensor to the magnets are obtained according to the computation formula or map on the basis of the outputs obtained by means of the magnetic sensor. Based on these data, the inflation pressure of the tire is obtained according to a pressure computation formula or a map indicative of the relationship between the tire inflation pressure and the distance between the magnets.

7 Claims, 4 Drawing Sheets

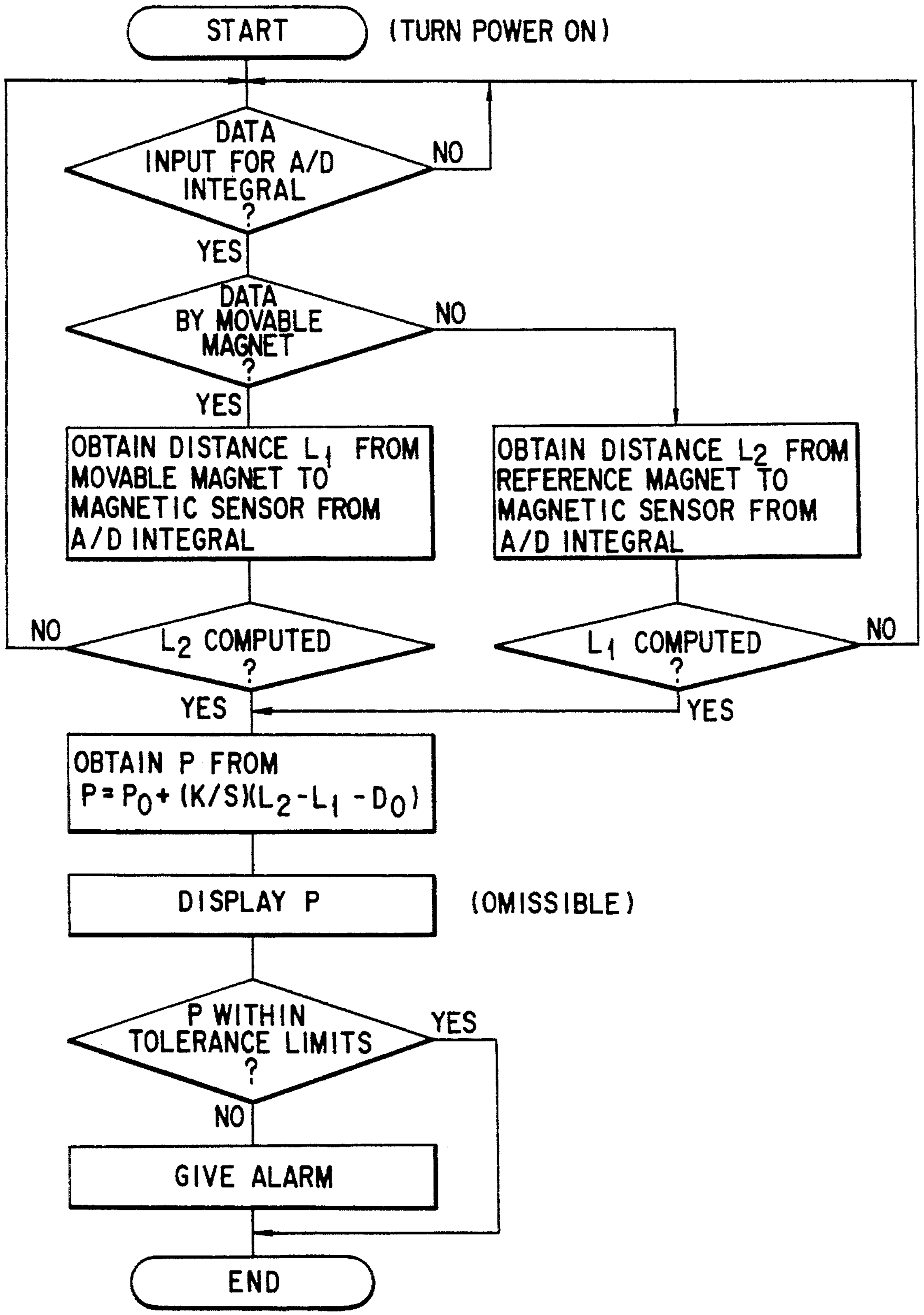
F I G. 4

TIRE INFLATION PRESSURE MONITORING APPARATUS

BACKGROUND OF THE INVENTION

1. Field of the Invention

The present invention relates to a tire inflation pressure monitoring apparatus for checking the inflation pressure of pneumatic tires of, for example, vehicles, aircraft, etc.

2. Description of the Related Art

Described in Jpn. Pat. Appln. KOKOKU Publication No. 4-40211 (U.S. Pat. No. 4,742,857), U.S. Pat. No. 4,953,394, etc. are tire inflation pressure monitoring apparatuses which are proposed as means for detecting the inflation pressure of the tires of a vehicle while the vehicle is running. In these monitoring apparatuses, a transducer including a movable magnet is attached to a wheel rotating integrally with a tire, and a magnetic sensor is attached to a member on the vehicle body side. The movable magnet is designed so as to shift its position in the axial direction of the wheel as the tire inflation pressure changes. Thus, the higher the inflation pressure, the shorter the minimum distance from the movable magnet to the magnetic sensor is.

The magnetic sensor, which includes a magnetic coil, is used to detect the magnetism of the magnet as the wheel rotates, and generates an electromotive force of a magnitude corresponding to the minimum distance from the magnet by magnetic induction. This electromotive force is converted into a digital integral by means of an integrator and analog-to-digital converter. Hereinafter, this value will be referred to as A/D integral.

The movable magnet moves for a distance proportional to the tire inflation pressure in the axial direction of the wheel. If the position of the movable magnet with the tire at a reference pressure and the changing rate of the position of the movable magnet, compared to the change in pressure, are obtained in advance, therefore, the pressure can be obtained by detecting the moved distance of the magnet by using some suitable means (e.g., magnetic sensor). Theoretically, therefore, it is necessary only that the change of the minimum distance from the magnetic sensor to the movable magnet be computed in accordance with the variation of the A/D integral of the aforesaid induced electromotive force so that the tire inflation pressure can be obtained on the basis of the change in distance.

Actually, however, the wheels of a running vehicle roll in some measure as they rotate. As the vehicle corners, moreover, the wheels are subjected to a lateral load, so that they are distorted or axially moved with respect to the vehicle body. Inevitably, therefore, the distance from the magnetic sensor to each wheel varies. Thus, the minimum distance from the magnetic sensor to the magnet may be changed by some external factors irrelevant to the tire inflation pressure, in some cases. In consequence, the tire inflation pressure cannot be accurately determined by only measuring the magnetic sensor output by means of the movable magnet.

SUMMARY OF THE INVENTION

Accordingly, the object of the present invention is to provide a tire inflation pressure monitoring apparatus, capable of accurately detecting the inflation pressure of a tire even though the distance from the magnetic sensor to the wheel is changed from any cause and enjoying easy calibration.

In a tire inflation pressure monitoring apparatus according to the present invention, developed in order to achieve the above object, the wheel is provided with a fixed magnet (reference magnet) for calibration, which cannot be influenced by the change of pressure, besides the aforesaid movable magnet. Despite the change of the distance from the magnetic sensor to the wheel, therefore, the relative distance from the movable magnet to the reference magnet cannot be changed unless the tire inflation pressure varies. According to the invention, moreover, the tire inflation pressure is computed on the assumption that it changes as the relative distance from the movable magnet to the reference magnet changes. By doing this, other causes of change than the pressure are canceled.

Thus, according to the present invention, there is provided a tire inflation pressure monitoring apparatus for detecting the inflation pressure of a tire attached to a wheel, which comprises: reference means including a reference magnet fixed to the wheel; a transducer attached to the wheel and including a movable magnet whose position shifts for a distance corresponding to the inflation pressure of the tire in the axial direction of the wheel; a stationary-side member facing the wheel at a distance therefrom in the axial direction thereof; a magnetic sensor attached to the stationary-side member, the sensor being situated in a position such that the sensor can detect the magnetism of the reference magnet and the movable magnet when the wheel rotates and adapted to generate outputs of magnitudes corresponding to the minimum distance from the reference magnet and the minimum distance from the movable magnet as the wheel rotates; means for storing a previously obtained computation formula or map indicative of the relationships between the outputs of the magnetic sensor and the minimum distances from the magnets to the magnetic sensor; and means for obtaining data associated with the minimum distances from the magnetic sensor to the magnets according to the computation formula or map on the basis of the outputs obtained by means of the magnetic sensor in detecting the inflation pressure of the tire, and obtaining the tire inflation pressure according to a pressure computation formula or map indicative of the relationship between the tire inflation pressure and the distance between the magnets on the basis of the obtained data.

Preferably, the reference means includes a position adjusting mechanism capable of moving the reference magnet in the axial direction of the wheel.

As the wheel rotates, the reference magnet and the movable magnet individually pass beside the magnetic sensor, whereupon the sensor generates the outputs corresponding to the minimum distances from the magnets. Although the position of the reference magnet relative to the wheel is fixed without regard to the tire inflation pressure, that of the movable magnet shifts in the axial direction of the wheel, depending on the inflation pressure.

Computing means, which includes, e.g., a microcomputer, is stored beforehand with a computation formula, such as equation (1) according to the embodiment mentioned later, or map indicative of the relationships between the outputs of the magnetic sensor and the minimum distances from the magnets to the magnetic sensor, previously obtained by calibration. The computation formula or map obtained by the calibration can be determined without attaching the wheel with the magnets thereon to an actual vehicle, once the magnets and the magnetic sensor used with the monitoring apparatus are settled. Thus, the calibration can be carried out accurately and easily.

In detecting the inflation pressure of the tire, the data associated with the minimum distances $L_1$ and $L_2$ from the magnetic sensor to the reference magnet and the movable magnet are obtained according to the computation formula or map on the basis of the outputs obtained by means of the magnetic sensor.

Further, the computing means is stored with a pressure computation formula or map with values associated with the distance between the reference and movable magnets as variables, e.g., a formula given by $$P=P_0+(k/s)\times(L_2-L_1-D_0).$$

Based on this pressure computation formula or map and the data associated with the minimum distances $L_1$ and $L_2$, the tire inflation pressure can be obtained according to the distance ($L_2-L_1$) between the magnets. In this case, the pressure is obtained in accordance with the relative positions of the reference and movable magnets, so that the tire inflation pressure can be obtained accurately despite the change of the distance from the magnetic sensor to the wheel.

In the aforesaid equation, $P_0$ and $D_0$ are values set during the calibration. More specifically, $P_0$ is a reference pressure at the time of the calibration, and $D_0$ is a relative distance (offset value) from the reference magnet to the movable magnet obtained when the reference pressure $P_0$ is given. Moreover, k/s is a constant.

The offset value $D_0$ is adjusted to a predetermined value (e.g., zero). Since the reference means according to the present invention is provided with the position adjusting mechanism, the offset value $D_0$ can be easily adjusted to a desired value suited for the computation and the like during the calibration. The value $D_0$ need not always be zero. In the case of a vehicle having a plurality of car wheels (e.g., four wheels), however, it is advisable to use the same offset value $D_0$ for the individual wheels to share computation programs including the pressure computation formula, in order to process the outputs of the magnetic sensors for the individual wheels by using the same formula.

BRIEF DESCRIPTION OF THE DRAWINGS

FIG. 4 is a flow chart showing some of processes executed by a controller of the monitoring apparatus shown in FIG. 2;

DETAILED DESCRIPTION OF THE PREFERRED EMBODIMENT

Referring now to FIGS. 1 to 4, an embodiment of the present invention will be described.

Figure 2:
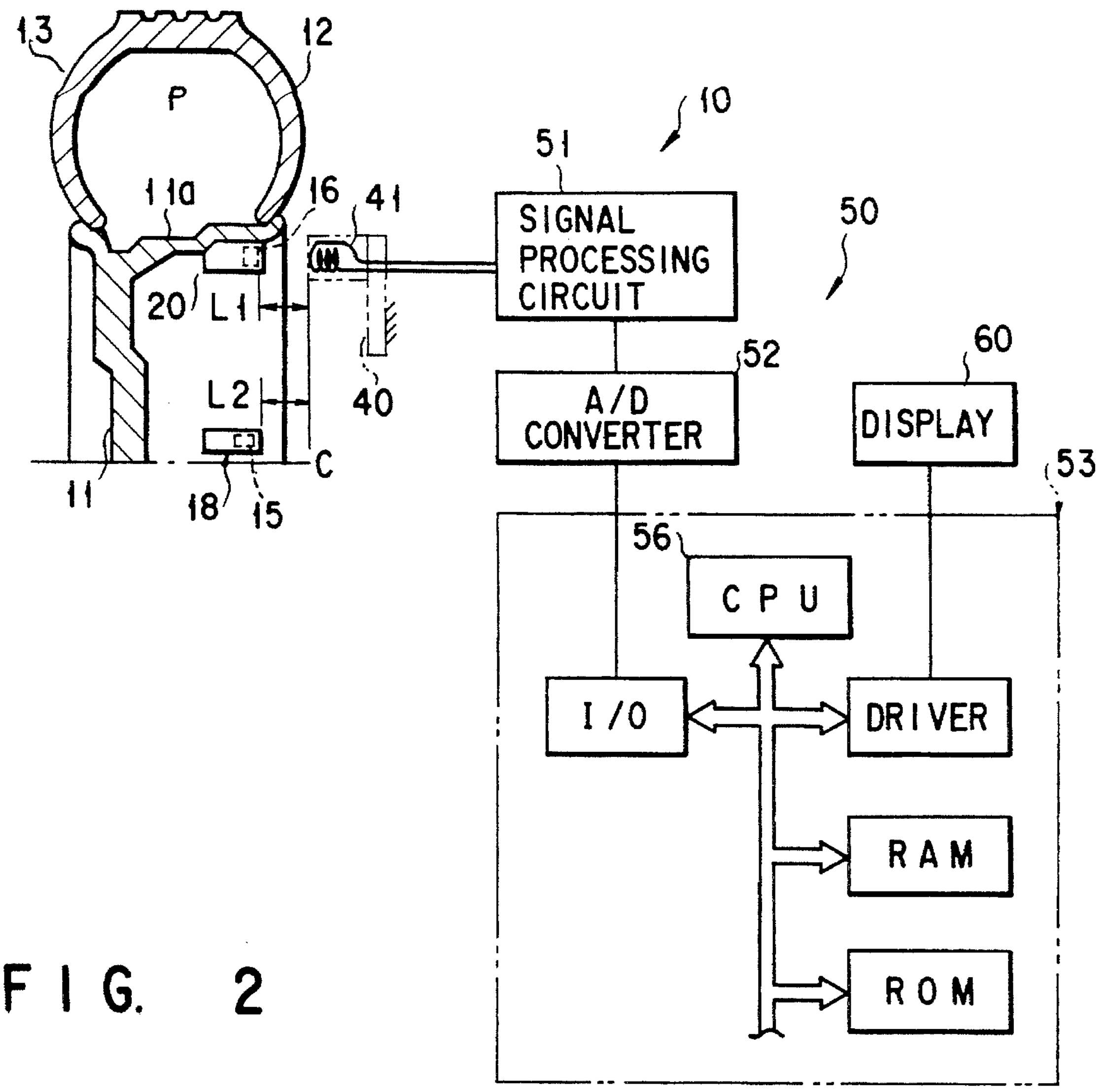
FIG. 2 is a combination of a sectional view of a car wheel unit of the monitoring apparatus and a block diagram of an electric circuit section.

FIG. 2 shows an outline of a tire inflation pressure monitoring apparatus 10 according to the present embodiment. The monitoring apparatus 10 comprises a car wheel unit 13, which includes a wheel 11 and a tire 12, a stationary magnet (reference magnet) 15, and a movable magnet (main magnet) 16. The movable magnet 16 is contained in a transducer 20 which is attached to a rim portion 11*a* of the wheel 11. The distance from the reference magnet 15 to the central axis C of the wheel 11 is substantially equal to the distance from the movable magnet 16 to the central axis C. Thus, the magnets 15 and 16 are arranged on the circumference of one circle.

Figure 1:
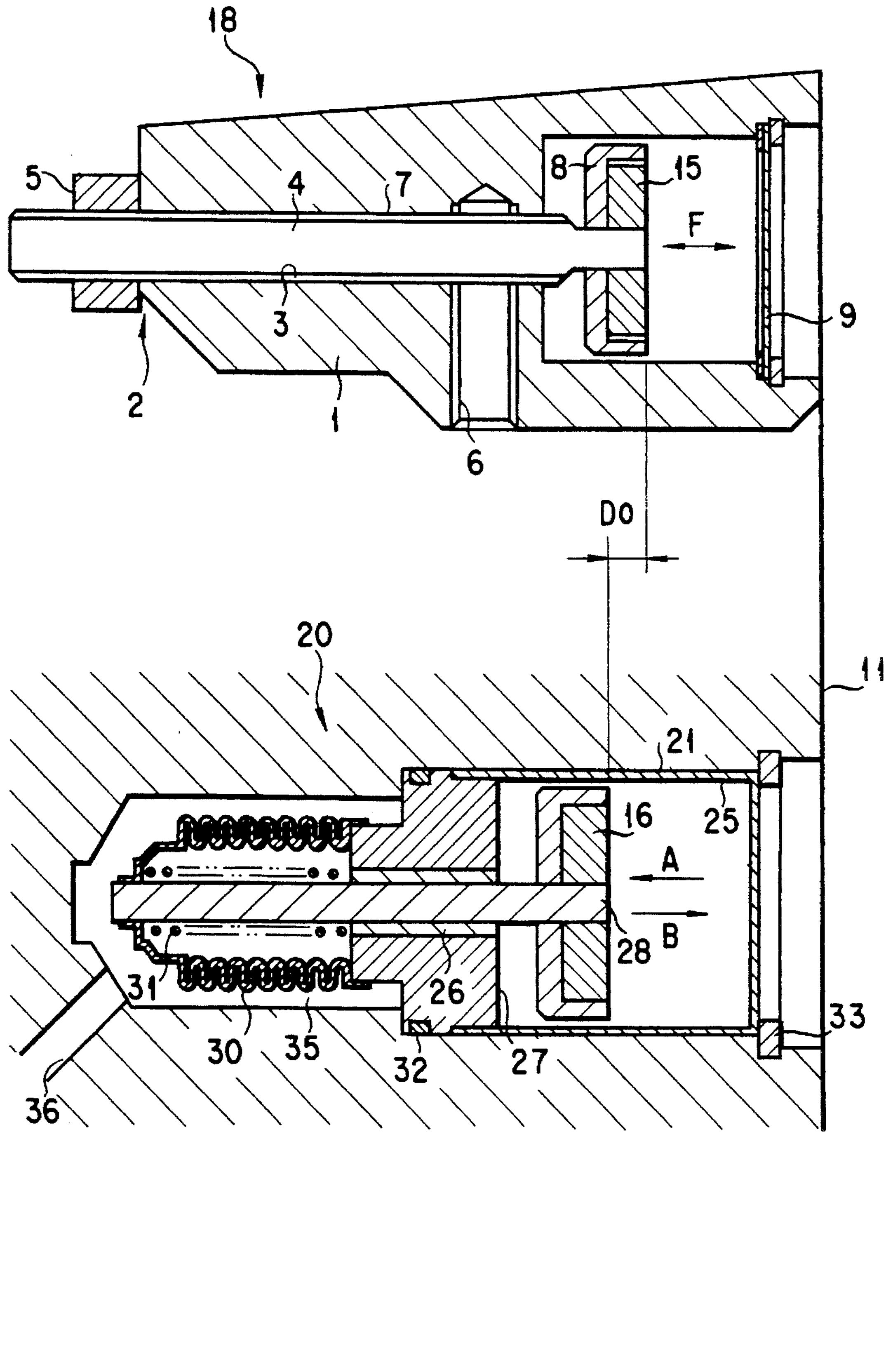
FIG. 1 is a sectional view showing a reference magnet, movable magnet, and other components used in a tire inflation pressure monitoring apparatus according to an embodiment of the present invention.

As shown in FIG. 1, the reference magnet 15 is held on a bracket 1 on the wheel 11 by means of a position adjusting mechanism 2. The bracket 1 may be a part of the wheel 11. Typically, the adjusting mechanism 2 includes a tapped hole 3 in the bracket 1, a rod 4 screwed in the hole 3, a locking nut 5 for fixing the rod 4, and the like. Alternatively, the rod 4 may be fixed by screwing a setscrew (not shown) into a tapped hole 6 which extends at right angle to the rod 4.

The tapped hole 3 and the rod 4 extend in the axial direction of the wheel 11. Formed on the outer peripheral surface of the rod 4 is an external thread portion 7, which mates with the tapped hole 3. When the rod 4 is rotated, therefore, it advances corresponding to the number of revolutions, whereby the reference magnet 15 shifts its position in the direction of arrow F, that is, in the axial direction of the wheel 11. Thus, an offset value $D_0$ of the reference magnet 15 with respect to the movable magnet 16 can be adjusted to a desired value (e.g., zero).

In short, the position adjusting mechanism 2 must only be designed so that it can adjust the position of the reference magnet 15 in the axial direction of the wheel 11. Therefore, the mechanism 2 may be of various other configurations than the illustrated one. In the arrangement shown in FIG. 1, a holder 8 is mounted on the distal end portion of the rod 4, and the disk-shaped reference magnet 15 is fixed to the holder 8. A cap 9 is provided on the front side of the magnet 15. The reference magnet 15 and the position adjusting mechanism 2 constitute reference means 18.

The transducer 20 is fitted in a transducer mounting hole 21 in the wheel 11. It includes a cylindrical housing 25, a body 27 having a linear bearing 26, and a movable shaft 28 passed through the bearing 26. The transducer 20 further includes the movable magnet 16 fixed to an end portion of the shaft 28, a metallic bellows 30 capable of extension and contraction in the axial direction of the shaft 28, a compression coil spring 31, a sealing member 32, etc. The axial position of the transducer 20 is fixed by means of a retaining ring 33. One and the other ends of the bellows 30 are airtightly fixed to the body 27 and the movable shaft 28, respectively.

The movable shaft 28 is movable in the axial direction of the wheel 11 (horizontal direction as in FIG. 1), and is urged in the direction of arrow A by means of the spring 31. An air chamber 35, which is defined by the inner surface of the transducer mounting hole 21 and the body 27, opens into the inside space of the tire through a communication hole 36 so that the tire inflation pressure acts in the direction (direction of arrow B) to compress the bellows 30. Therefore, the movable magnet 16 moves in the direction of arrow A when the tire inflation pressure is low, and in the direction of arrow B when the inflation pressure is high. Thus, the magnet 16 moves for a distance corresponding to the tire inflation pressure in the axial direction of the wheel 11.

As shown in FIG. 2, a magnetic coil (sensing coil), as an example of a magnetic sensor 41, is attached to a car-body- or stationary-side member 40 which faces the wheel 11 at a distance therefrom. The car-body-side member 40 constitutes part of, for example, a hub carrier or axle beam of a suspension mechanism. In short, it is a member which is stationary as compared with the rotating wheel 11. The direction of magnetic fields generated by means of the magnets 15 and 16 and the central axis of the coil of the magnetic sensor 41 are aligned with the axial direction of the wheel 11.

The magnetic sensor 41 is situated in a position which faces traces of rotation of the reference magnet 15 and the movable magnet 16 during the rotation of the wheel 11. As the magnets 15 and 16 pass beside it, the sensor 41 generates electromotive forces of magnitudes corresponding to minimum distances $L_1$ and $L_2$ from the magnets 15 and 16, by magnetic induction.

Figure 3:
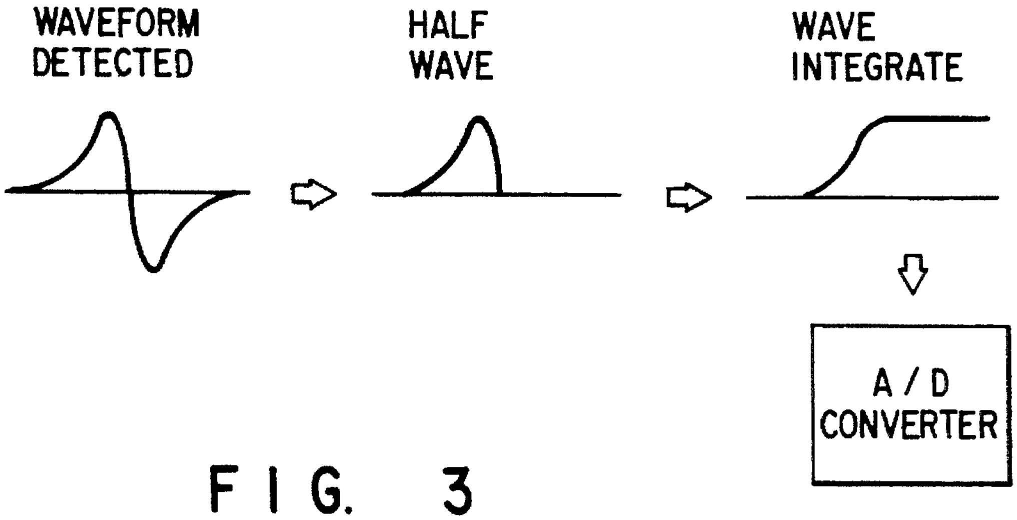
FIG. 3 is a waveform diagram showing an example of the output of a magnetic sensor of the monitoring apparatus shown in FIG. 2.

Thus, when the wheel 11 rotates, induced electromotive forces with waveforms shown in FIG. 3 are generated every time the magnets 15 and 16 pass by the magnetic sensor 41. The shorter the minimum distances $L_1$ and $L_2$ from the magnets 15 and 16 to the sensor 41, the greater the electromotive force is. Since this electromotive force is also proportional to the peripheral speed of the wheel 11, an integral of a voltage, not the value of the voltage itself, is calculated in order to fetch output signals which are not affected by changes of the car speed, according to the present embodiment.

The magnetic sensor 41 is connected with an electric circuit section 50 for use as computing means, such as a microcomputer. The circuit section 50 comprises a signal processing circuit 51 for processing output signals from the sensor 41, an A/D converter circuit 52, a controller 53, etc.

A CPU 56 of the controller 53 obtains an inflation pressure P of the tire by data processing which will be mentioned later. A display unit 60 for use as display means is located in a position accessible to a car user's view, e.g., on an instrument board in a driving cab, and displays information on the tire inflation pressure obtained by means of the electric circuit section 50. Alternatively, the display means may be acoustic means, such as a buzzer, which sounds an alarm when the tire inflation pressure is abnormal.

The following is a description of the operation of the tire inflation pressure monitoring apparatus 10 with the aforementioned construction.

When the wheel 11 rotates, the reference magnet 15 and the movable magnet 16 passes in succession beside the magnetic sensor 41. Thereupon, two types of electromotive forces are generated alternately as the wheel 11 makes one revolution. The voltage waveforms of the electromotive forces are rectified by means of the signal processing circuit 51, shaped, and integrated. Thereafter, the waveforms, analog values, are converted into digital values by means of the A/D converter circuit 52, and the digital values are applied to the input of the controller 53.

Although the position of the reference magnet 15 never varies despite the change of the tire inflation pressure, that of the movable magnet 16 shifts in the axial direction of the wheel 11, depending on the inflation pressure. If the inflation pressure changes, therefore, the minimum distance $L_1$ from the magnetic sensor 41 to the movable magnet 16 varies. The magnets 15 and 16 generate equivalent magnetic fields.

In the controller 53, the tire inflation pressure P is computed in accordance with the magnetic sensor output by the data processing illustrated in FIG. 4, and is displayed as required.

According to the present embodiment, the following equation (1), which is indicative of the relationships between the minimum distances L ($L_1$, $L_2$) from the magnets 15 and 16 to the magnetic sensor 41 and the magnetic sensor output I (A/D integral), is previously obtained by observed data analysis after the specifications of the magnets 15 and 16 and the sensor 41 are settled individually. Typically, equation (1) is given in the form of a cubic equation (approximate equation) as follows:

$$\text{Distance } L=aI^3+bI^2+cI+d, \quad (1)$$

where $a=-3796\times10^{-13}$, $b=3821\times10^{-9}$, $c=-155\times10^{-5}$, $d=22.54$.

The relationships between L and I represented by the above equation may be mapped and stored in a ROM of the electric circuit section 50. Instead of converting the A/D integral into a distance, the A/D integral may be corrected by using a certain conversion formula (function).

In detecting the tire inflation pressure, the minimum distance $L_1$ from the movable magnet 16 to the magnetic sensor 41 is obtained in accordance with outputs of the magnetic sensor obtained for the individual magnets 15 and 16 and equation (1) or a map, and the minimum distance $L_2$ from the reference magnet 15 to the sensor 41 is obtained. Based on the values $L_1$ and $L_2$, the tire inflation pressure P is obtained according to the following equation (2) or a map obtained in advance.

$$P=P_0+(k/s)\times(L_2-L_1-D_0), \quad (2)$$

where $P_0$ and $D_0$ are values set during calibration. More specifically, $P_0$ is a reference pressure at the time of the calibration, and $D_0$ is a relative distance (offset value) from the reference magnet 15 to the movable magnet 16 obtained when the reference pressure $P_0$ is given. Moreover, k is a total spring constant for the combination of the bellows 30 and the spring 31, and s is the pressure receiving area of the bellows 30.

Typically, k/s is given at 1.094 ($kgf/cm^2/cm$), which is a proper figure corresponding to the specifications of the bellows 30 and the spring 31. Typically, moreover, $P_0$ is given at 2.1 ($kgf/cm^2$), and the offset value $D_0$ is adjusted to zero for ease of computation.

The offset value $D_0$ need not always be zero. In the case of a vehicle having a plurality of car wheels (e.g., four wheels), however, it is advisable to use the same offset value $D_0$ for the individual wheels to share computation programs including the pressure computation formula or equation (2), in order to process the outputs of the magnetic sensors 41 for the individual wheels by using the same formula (2).

The following is a description of three cases in which the tire inflation pressure P is obtained specifically by means of the pressure computation formula (2).

According to a first example of pressure computation, the A/D integral of the movable magnet 16 is 2,523, the A/D integral of the reference magnet 15 is 2,523, and the computed pressure P with $L_1$=1.508 cm and $L_2$=1,508 cm is 2.10 (standard pressure).

According to a second example of pressure computation, the A/D integral of the movable magnet 16 is 2,590, the A/D integral of the reference magnet 15 is 2,523, and the computed pressure P with $L_1$=1.276 cm and $L_2$=1,508 cm is 2.35 (excess pressure).

According to a third example of pressure computation, the A/D integral of the movable magnet 16 is 2,468, the A/D integral of the reference magnet 15 is 2,523, and the computed pressure P with $L_1$=1,705 cm and $L_2$=1,508 cm is 1.89 (insufficient pressure).

After obtaining the tire inflation pressure P in this manner, the value P may be displayed directly on the display unit 60 in the driving cab, or a warning lamp, alarm buzzer, or any other suitable means may be switched on for the driver's information when the value P is deviated from predetermined tolerance limits.

Figure 5:
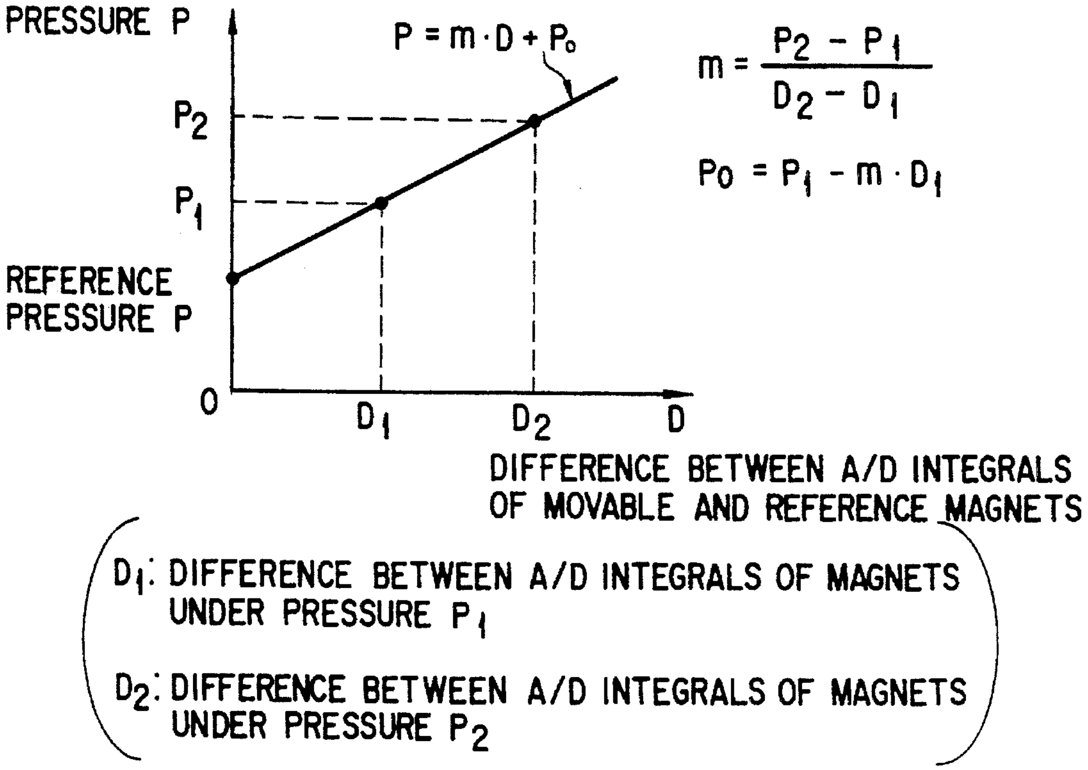
FIG. 5 is a graph representing a computation formula conventionally used for the tire inflation pressure detection before the completion of the present invention.

Before the completion of the present invention, the reference magnet 15 used to be entirely fixed to the wheel 11, so that it was not able to be moved in the axial direction of the wheel 11. In measuring the tire inflation pressure by means of the movable magnet 16 and the reference magnet 15, the following approximate linear equation (3) was used to compute the pressure.

$$P=m \cdot D+P_0, \quad (3)$$

where D is a variable indicative of the difference between the respective A/D integrals of the movable magnet 16 and the reference magnet 15, m is the changing rate of pressure, and $P_0$ is the reference pressure. FIG. 5 is a graph which represents equation (3).

Thus, in order to compute the pressure P according to equation (3), the changing rate m (inclination of the straight line of FIG. 5) and the reference pressure $P_0$ (intercept of ordinate axis) are obtained in advance by calibration. The pressure P is obtained directly by detecting the value D by means of the magnetic sensor.

In obtaining m and $P_0$ of equation (3), each tire attached to an actual vehicle is charged with a first inflation pressure $P_1$ at the time of calibration, and the vehicle is actually driven with use of the pressure $P_1$. Alternatively, the tire is rotated on a chassis dynamometer, and a difference $D_1$ between the respective A/D integrals of the movable magnet 16 and the reference magnet 15, then detected by means of the magnetic sensor 41, is measured. Subsequently, each tire is charged with a second inflation pressure $P_2$, and the vehicle is actually driven with use of the pressure $P_2$. Alternatively, the tire is rotated on the chassis dynamometer, and a difference $D_2$ between the respective A/D integrals of the magnets 16 and 15, then detected by means of the magnetic sensor 41, is measured. The values m and $P_0$ are obtained by substituting the values $P_1$, $P_2$, $D_1$ and $D_2$ into the following equations:

$$m=(P_2-P_1)/(D_2-D_1),$$

and $$P_0=P_1-m \times D_1.$$

In obtaining the tire inflation pressure in this manner, the calibration cannot be carried out unless the actual vehicle is fitted with the wheels. Moreover, it is necessary to drive the vehicle actually or rotate each tire on the chassis dynamometer, so that the calibration takes much trouble. In carrying out the calibration, furthermore, adjustment of the vehicle must be committed to the user's care after the wheels are attached to the vehicle. Thus, the aforesaid method is hardly practical. Also, an error may be caused if the pressure changes with the change of the tire temperature during the calibration. When the relative positions of the wheels and the vehicle body are changed, moreover, the calibration must be repeated.

A study made by the inventors hereof indicates that the pressure obtained according to equation (3) is subject to a substantial detection error for the following reason.

More specifically, according to equation (3), the relative distance from the movable magnet 16 to the reference magnet 15 is replaced with the difference (value D) between the respective A/D integrals of the magnets 16 and 15, and the pressure P is detected directly from the value D in accordance with the linear equation which approximately indicates the relationship between the value D and the pressure P. Actually, however, the relations between the distances L (minimum distances from the magnetic sensor to the magnets) and the A/D integral I or the magnetic sensor output are not linear, as shown in FIG. 6.

Figure 6:
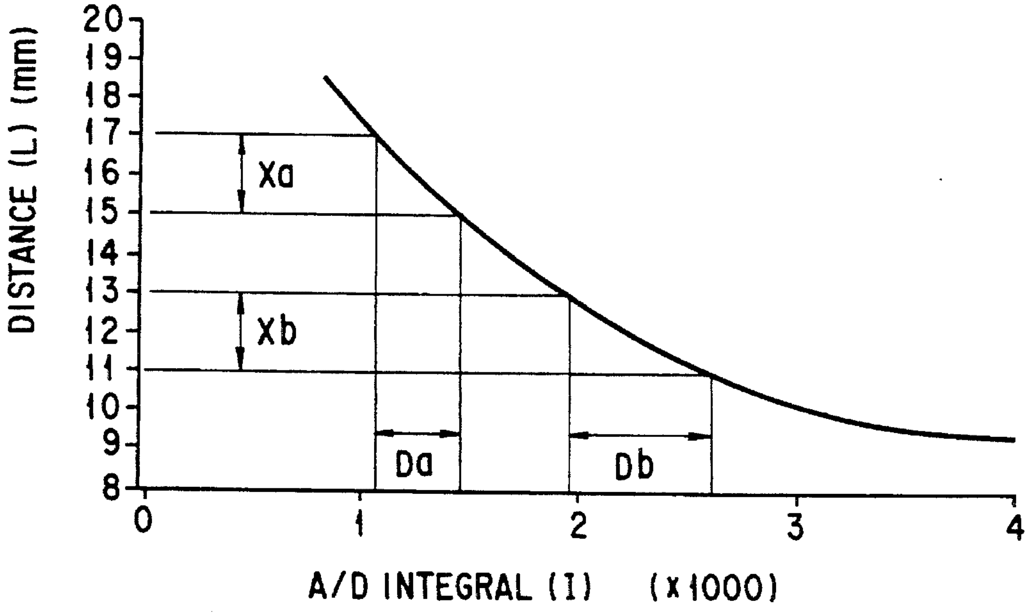
FIG. 6 is a diagram showing the relationship between magnetic sensor output (A/D integral) and distance.

Even though a relative distance $x_a$ between the magnets 15 and 16 obtained when the minimum distances L from the magnetic sensor 41 are long is equal to a relative distance $x_b$ between the magnets 15 and 16 obtained when the minimum distances L are short, as seen from the characteristic curve of FIG. 6, for example, differences $D_a$ and $D_b$ between the A/D integrals are not equal. In other words, a change of the value D does not always result in a change of the pressure P. Thus, if the pressure P is obtained directly from the value D, as in the conventional system, a considerably significant error may be caused in some cases.

The above problem was able to be solved by the embodiment of the present invention described above. Thus, according to the invention, the inflation pressure of the tire 12 can be accurately detected by the output of the magnetic sensor 41 even though the distance from the sensor 41 to the wheel 11 is changed. Moreover, the calibration requires neither the actual vehicle drive nor the rotation on the chassis dynamometer, and the relative distance $D_0$ between the reference magnet 15 and the movable magnet 16 can be adjusted to the desired offset value when the reference pressure $P_0$ is set during the calibration. Thus, the operation for the calibration can be facilitated.

In connection with the embodiment described herein, the magnetic coil has been described as an example of the magnetic sensor 41. In carrying out the present invention, however, the magnetic coil may be replaced with any other magnetic sensor, such as a Hall element, which can produce outputs corresponding to the intensities of magnetic forces from the magnets 15 and 16. Moreover, a plurality of reference magnets 15 may be provided for an alternative arrangement.

What is claimed is:

1. A tire inflation pressure monitoring apparatus for detecting the inflation pressure of a tire attached to a wheel, comprising:

reference means including a reference magnet fixed to the wheel;

a transducer attached to the wheel and including a movable magnet whose position shifts for a distance corresponding to the inflation pressure of the tire in the axial direction of the wheel;

a stationary-side member facing the wheel at a distance therefrom in the axial direction thereof;

a magnetic sensor attached to the stationary-side member, the sensor being situated in a position such that the sensor can detect the magnetism of the reference magnet and the movable magnet when the wheel rotates and adapted to generate outputs of magnitudes corresponding to the minimum distance from the reference magnet and the minimum distance from the movable magnet as the wheel rotates;

means for storing a previously obtained computation formula or map indicative of the relationships between the outputs of the magnetic sensor and the minimum distances from the magnets to the magnetic sensor;

electric circuit means for obtaining data associated with the minimum distances from the magnetic sensor to the magnets according to the computation formula or map on the basis of the outputs obtained by means of the magnetic sensor in detecting the inflation pressure of the tire, and obtaining the tire inflation pressure according to a pressure computation formula or map indicative of the relationship between the tire inflation pressure and the distance between the magnets on the basis of the obtained data; and notifying means for notifying of information relating to the tire inflation pressure obtained by said electric circuit means.

2. A tire inflation pressure monitoring apparatus according to claim 1, wherein said reference means includes a position adjusting mechanism capable of moving the reference magnet in the axial direction of the wheel and fixing the reference magnet in a desired position.

3. A tire inflation pressure monitoring apparatus according to claim 2, wherein said position adjusting mechanism of the reference means includes a bracket fixed to the wheel, a tapped hole formed in the bracket and extending along the axial direction of the wheel, a rod screwed in the tapped hole and fitted with the reference magnet, and locking means for fixing the rod to the bracket.

4. A tire inflation pressure monitoring apparatus for detecting the inflation pressure of a tire attached to a wheel, comprising:

reference means including a reference magnet attached to the wheel and a position adjusting mechanism capable of moving the reference magnet in the axial direction of the wheel;

a transducer attached to the wheel and including a movable magnet whose position shifts for a distance corresponding to the inflation pressure of the tire in the axial direction of the wheel;

a stationary-side member facing the wheel at a distance therefrom in the axial direction thereof;

a magnetic sensor attached to the stationary-side member, the sensor being situated in a position such that the sensor can detect the magnetism of the reference magnet and the movable magnet when the wheel rotates and adapted to generate outputs of magnitudes corresponding to the minimum distance from the reference magnet and the minimum distance from the movable magnet as the wheel rotates;

computing means for obtaining the tire inflation pressure in accordance with the outputs of the magnetic sensor obtained individually when the reference magnet and the movable magnet pass by the magnetic sensor; and notifying means for notifying of information relating to the tire inflation pressure obtained by said computing means.

5. A tire inflation pressure monitoring apparatus according to claim 4, wherein said position adjusting mechanism of the reference means includes a bracket fixed to the wheel, a tapped hole formed in the bracket and extending along the axial direction of the wheel, a rod screwed in the tapped hole and fitted with the reference magnet, and locking means for fixing the rod to the bracket.

6. A tire inflation pressure monitoring apparatus according to claim 4, wherein said transducer includes a body fixed to the wheel, a closed air chamber fed with the inflation pressure of the tire, a movable shaft movable in the axial direction of the wheel and urged in a first direction by means of the inflation pressure in the air chamber, the movable magnet attached to the movable shaft, a spring for urging the movable shaft in a second direction opposite to the first direction, a metallic bellows having two opposite ends and capable of extension and contraction in the axial direction of the movable shaft, one and the other ends of the bellows being airtightly connected to the body and the movable shaft, respectively.

7. A tire inflation pressure monitoring apparatus according to claim 4, wherein said computing means includes means for storing a previously obtained computation formula or map indicative of the relationships between the outputs of the magnetic sensor and the minimum distances from the magnets to the magnetic sensor, and means for obtaining data associated with the minimum distances from the magnetic sensor to the magnets according to the computation formula or map on the basis of the outputs obtained by means of the magnetic sensor in detecting the inflation pressure of the tire, and obtaining the tire inflation pressure according to a pressure computation formula or map indicative of the relationship between the tire inflation pressure and the distance between the magnets on the basis of the obtained data.

* * * * *